United States Patent [19]

Anderson

[11] 4,256,986
[45] Mar. 17, 1981

[54] MAGNETIC PICKUP SUBASSEMBLY

[75] Inventor: Glenn R. Anderson, Minneapolis, Minn.

[73] Assignee: Minnesota Mining and Manufacturing Company, St. Paul, Minn.

[21] Appl. No.: 30,464

[22] Filed: Apr. 16, 1979

[51] Int. Cl.³ .......................................... H02K 21/38
[52] U.S. Cl. ..................................... 310/155; 310/168
[58] Field of Search ....................... 310/152, 155, 168

[56] References Cited

U.S. PATENT DOCUMENTS

| 3,876,927 | 4/1975 | Gee et al. ........................ 310/155 X |
| 3,942,045 | 3/1976 | Palazetti .............................. 310/155 |
| 4,011,478 | 3/1977 | Reenstra ............................. 310/155 |

Primary Examiner—Donovan F. Duggan

[57] ABSTRACT

Magnetic pickup having a matrix-bonded permanent magnet sleeve around one end of an elongated cylindrical pole piece and a coil around the other end. The magnet sleeve has a preferred direction of magnetization radial to the axis of the pole piece.

11 Claims, 5 Drawing Figures

MAGNETIC PICKUP SUBASSEMBLY

BACKGROUND OF THE INVENTION

Magnetic sensors or pickups, by converting mechanical motion into electric energy, may be used to measure speed or as a source of electric signals. A typical magnetic pickup for measuring rotational speed is shown in FIG. 1 of U.S. Pat. No. 3,794,855. An elongated permanent magnet is contacted at one pole to one end of an elongated ferromagnetic pole piece which carries an electric coil. As the teeth of a ferrous rotor move past the other end of the pole piece, the overall reluctance of the magnetic circuit changes, thus inducing an AC voltage in the coil. Sometimes the magnetic pickup is mounted within a ferromagnetic casing which provides an easy return path for the magnetic flux from the pole piece to the magnet, as in U.S. Pat. No. 3,980,913. Usually the permanent magnet is of the Alnico type. Other permanent magnet materials have been little used in magnetic pickups of the U.S. Pat. No. 3,794,855 design, either being too weak magnetically or too expensive to be commerically competitive.

Numerous other designs have been suggested for magnetic pickups. That of U.S. Pat. No. 4,045,738 is similar to that of U.S. Pat. No. 3,794,855 except that the magnet and pole piece are reversed, and the magnet is a very thin disk since it is a rare earth based permanent magnet. In U.S. Pat. No. 3,492,518, a coil wound on a ferromagnetic pole piece is positioned within a permanent magnet in the shape of a sleeve. In U.S. Pat. No. 4,061,938, a pair of toothed ferrous rotors and a permanent magnet are mounted on a shaft. As the teeth move past the elongated pole pieces of a pair of T-shaped yokes, pulses are generated in a magneto-electric transducer positioned between the yokes.

U.S. Pat. No. 3,878,432 illustrates two additional designs. In one, a coil is wound on a cylindrical permanent magnet which is mounted within a cup-shaped housing formed by an iron cylinder and an iron disk which together serve as pole pieces and a return path. In the other, a pair of pole pieces are affixed to the circular surfaces of a cylindrical permanent magnet on which a coil is wound.

While most of the aforementioned magnetic pickups are primarily based on rotary motion, a magnetic pickup for sensing linear motion is shown in U.S. Pat. No. 3,945,459. One species employs a ring-shaped permanent magnet having one pole at its inner-facing surface and the other pole at its outer-facing surface. Reluctance changes are sensed by a coil positioned coaxially with the magnet within a ferrous cylinder when a notched or toothed shaft moves coaxially within the coil and magnet. The patent apparently does not identify the permanent magnet which, unlike the permanent magnets of the pickups mentioned above, is magnetized in the radial directions. However, U.S. Pat. No. 3,127,461 teaches a ring-shaped permanent magnet comprising matrix-bonded permanent magnet particles of barium, strontium and/or lead ferrite which have been aligned to have preferred directions of magnetization perpendicular to its axis. It is magnetized to have one pole at its inner-facing surface and the other pole at its outer-facing surface.

THE PRESENT INVENTION

The present invention concerns a subassembly of a magnetic sensor or pickup which like that of U.S. Pat. No. 3,794,855 has an elongated ferromagnetic pole piece which is substantially symmetrical about an axis. It differs from that of U.S. Pat. No. 3,794,855 in that it has a matrix-bonded permanent magnet in the shape of a sleeve which fits around and is substantially coterminous with one end of the pole piece while not substantially extending beyond the other end of the pole piece. Ideally, the magnet sleeve has preferred directions of magnetization radial to the axis of the pole piece.

While the magnet sleeve could be produced as disclosed in U.S. Pat. No. 3,127,461, it is more economically molded around the elongated pole piece, e.g., by injection molding as in U.S. Pat. No. 4,022,701 while applying a magnetic field to orient the magnet particles. Particularly preferred magnetic particles are disk-shaped, single-domain-size ferrities of barium, strontium and/or lead as disclosed in U.S. Pat. Nos. 2,999,275 and 3,903,228. Such particles are magnetically anisotropic and can be oriented in a magnetic field extending in all directions radial to the axis of the pole piece so that their easy axes of magnetization extend generally in the radial directions. Also useful are rare-earth-based permanent magnet particles such as stabilized $SmCo_5$ which are magnetically anisotropic. However, because of their high cost, it may be desirable to employ the rare-earth-based particles in admixture with the ferrite particles. On the other hand, the great strength of $SmCo_5$ and other rare-earth-based magnets permits miniaturization of the magnet pickup and its mounting, thus offsetting much if not all of the added cost of the magnet material. The nonmagnetic binder may be any of the resins identified in U.S. Pat. No. 4,022,701 or any other resin which both is suitable for injection molding and develops good adhesion to the magnetic particles. Mixtures comprising a major proportion by weight of the magnetic particles and a minor proportion of the nonmagnetizable binder can be molded to the precisely desired dimensions and shape.

The novel subassembly is formed to receive an electrical coil around the pole piece. If the magnet sleeve is only at one end of the pole piece, the coil may be fitted to the other end. If the magnet sleeve is coterminous with both ends of the pole piece, it may be formed with a recess into which the electrical coil may be wound. If desired, the coil may extend radially outwardly beyond the face of the magnet sleeve, but the subassembly should be designed so that the coil need not do so, since this would permit the subassembly to pass through an opening the size of the magnet sleeve. Miniaturization is generally of primary concern in the design of a magnetic sensor.

When injection molding the magnet sleeve around the pole piece, a coil may be first wound on the pole piece and then encapsulated by the magnet material if the die used in the injection molding is designed to allow the leads from the coil to reach beyond the cavity. In such a construction, the magnet sleeve would normally be coterminous with both ends of the pole piece.

The cross-section of the pole piece of the novel subassembly is preferably circular, but may have other shapes which are symmetrical such as a hexagon, octagon or an ellipse. The magnet sleeve necessarily fits around the pole piece. Preferably its exterior cross-section is circular for ease of fitting it into a mount, but that exterior surface may be threaded or otherwise shaped for convenience of mounting.

The construction of the novel subassembly inherently provides a relatively large area of contact between the magnet sleeve and pole piece and permits a relatively short return path for the magnetic flux. Consequently, the changes in magnetic flux based on matrix-bonded ferrite particles can be as large as or larger than are generated in Alnico pickups of the prior art. If greater changes in magnetic flux are desired, a small amount of $SmCo_5$ may be added to the ferrite particles.

THE DRAWING

Figure 1:
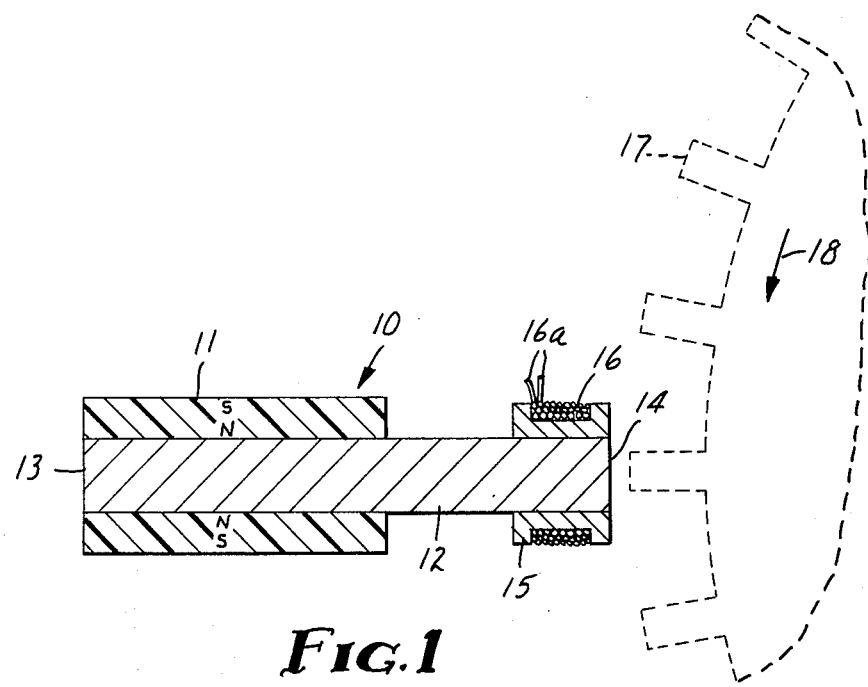
FIG. 1 is a schematic central section of a typical magnetic pickup embodying the invention.

The magnetic pickup 10 shown in FIG. 1 comprises a matrix-bonded permanent magnet sleeve 11 which fits around and is coterminous with one end 13 of an elongated cylindrical ferromagnetic pole piece 12. Fitted around the other end 14 of the pole piece 12 is a bobbin 15 on which is wound an electrical coil 16 having a pair of leads 16a.

Partially shown in phantom lines adjacent the end 14 of the pole piece is a toothed ferrous rotor 17 which rotates as indicated at arrow 18, each tooth changing the reluctance of the magnetic flux path from the magnet sleeve 11 through the pole piece 12, thus producing electrical signals on the leads 16a.

Figure 2:
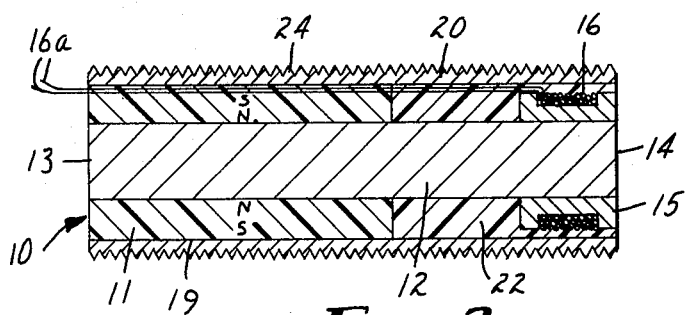
FIG. 2 is a schematic central section of the magnetic pickup of FIG. 1 which has been potted in a casing.

FIG. 2 shows the magnetic pickup 10 which has been inserted into a steel casing 20 and potted with an electrically insulating resin 22. Prior to potting, the leads 16a were embedded into the surface of the magnet sleeve 11, e.g., by heat and pressure or by fitting them into a shallow channel in cylindrical face 19 of the magnet sleeve. The exterior of the casing 20 has threads 24 for mechanically inserting the potted magnetic pickup into tapped holes (not shown) as in an engine block. In directions radial to the axis of the cylindrical pole piece 12, the bobbin 15 and its electrical coil 16 do not extend beyond the cylindrical face 19 of the magnet sleeve 11, thus permitting the interior of the casing to be uniformly cylindrical as shown.

Figure 3:
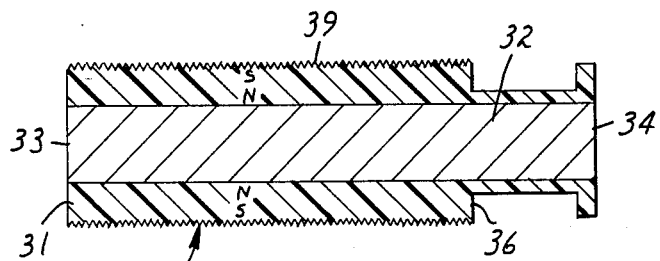
FIG. 3 is a schematic central section of a subassembly of another magnetic pickup which embodies the invention.

The magnetic pickup subassembly 30 shown in FIG. 3 has a magnet sleeve 31 which is coterminous with both ends 33 and 34 of the pole piece 32. At the end 34 of the pole piece, the magnet sleeve has been formed into the shape of a bobbin for winding an electrical coil. Only the other portion of the magnet sleeve 31 between its shoulder 36 and the end 33 of the pole piece need be magnetized.

The face 39 of the magnet sleeve 31 is threaded so that the subassembly 30 can be mounted without necessity for an external casing. If the subassembly 30 is screwed into the bore of a ferromagnetic object which extends close to the end 34 of the pole piece 32, that ferromagnetic object will provide an easy return path for the magnetic flux.

Figure 5:
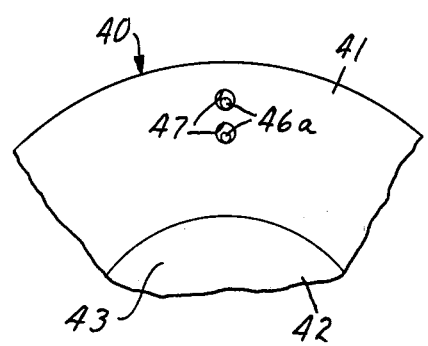
FIG. 5 is an enlarged, partial end view of the magnetic pickup of FIG. 4.
Figure 4:
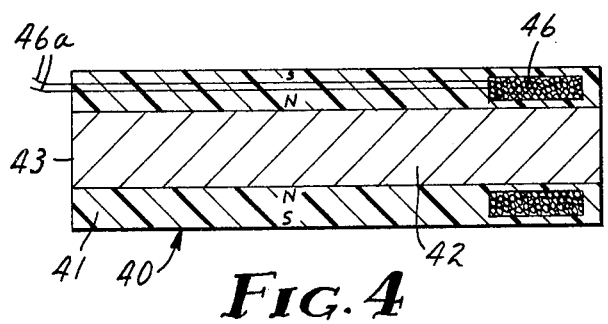
FIG. 4 is a schematic central section of a third magnetic pickup which embodies the invention.

In FIG. 4, the magnetic pickup 40 consists of a magnet sleeve 41 which has been molded around both a pole piece 42 and a coil 46. The leads 46a extend through the end of the magnet sleeve 41 opposite to the coil 46 so that the assembly can be inserted into a cylindrical bore. As best seen in FIG. 5, the magnet sleeve 41 is molded with a pair of cavities 47 through which the leads 46a emerge. In making electrical connections, the leads 46a are to be trimmed to be coterminous with the end 43 of the pole piece 42, and a male connector (not shown) is to be inserted into each of the cavities 47.

As shown in the drawing, each of the magnet sleeves 11, 31 and 41 fits closely around one of the ferromagnetic pole pieces 12, 32 and 42, respectively, and there is no ferromagnetic path directly between the inner and outer surfaces of the sleeve and hence no short circuit of the intended path for magnetic flux such as the path through the toothed ferrous rotor 17 of FIG. 1.

EXAMPLE

A mixture of 90.2 parts (63% by volume) of barium ferrite platelets of essentially domain size and 9.8 parts of a thermoplastic binder comprising polyamide resin was charged to a Banbury mixer and run through four speeds until the temperature reached 180° C., at which point it was immediately sheeted out on a roll mill to a thickness of about 0.6 cm. The sheet was cut into pieces which were chilled to −25° C., ground to particles 0.3 cm or smaller and fed into an injection molding machine (an Arburg Allrounder 221E/150 R) under the following conditions:

| Machine injection pressure | 1400 psi (98 kg/cm$^2$) |
|---|---|
| Machine hold pressure | 300 psi (21 kg/cm$^2$) |
| Injection speed | maximum |
| Machine temperature levels | |
| Feed | 205° C. |
| Meter | 220° C. |
| Nozzle | 232° C. |

The die had been machined to receive a cylindrical steel pole piece, 1¾ inch (4.5 cm) in length and ¼ inch (0.65 cm) in diameter to be insert molded. The die had a cylindrical cavity which was ½ inch (1.3 cm) in diameter and encompassed one inch (2.5 cm) of the cylindrical pole piece. The die was water cooled to a temperature of 50° C. A magnetic field of 12,000 oersteds was applied to the ends of the pole piece and extended through the cavity in all directions radial to the axis of the pole piece. The magnetic field was maintained both during and for 5 seconds following the injection, and after 30 seconds an insert molded subassembly (shown in FIG. 1 of the drawing), was ejected from the die thus providing a subassembly for a magnetic pickup.

To test the subassembly the free end of the pole piece was fitted with a 5-turn search coil. At a spacing of 0.06 inch (0.15 mm) from the teeth of a ferrous rotor (as seen in FIG. 1) running at 150 rpm, a 104 Maxwell difference was measured through the pole piece on passage of each tooth.

What is claimed is:

1. Subassembly of a magnetic pickup, said subassembly comprising
    an elongated ferromagnetic pole piece which is substantially symmetrical about an axis,
    a matrix-bonded permanent magnet sleeve which fits closely around the pole piece and is substantially coterminous with one end of the pole piece while not substantially extending beyond the other end of the pole piece, the magnet sleeve having preferred directions of magnetization radial to said axis and there being no ferromagnetic path directly between the inner and outer surfaces of the sleeve, said subassembly being formed to receive an electrical coil around said other end of the pole piece.

2. Subassembly as defined in claim 1 wherein the matrix-bonded magnet sleeve comprises barium, strontium and/or lead ferrite particles.

3. Subassembly as defined in claims 1 or 2 wherein the matrix-bonded magnet sleeve comprises stabilized rare-earth-based permanent magnet particles.

4. Subassembly as defined in claim 1 wherein the magnet sleeve is formed with screw threads.

5. Subassembly as defined in claim 1 wherein the magnet sleeve is substantially coterminous with said other end of the pole piece and is formed adjacent said other end in the shape of a bobbin for winding an electrical coil.

6. Subassembly as defined in claim 1 wherein the magnet sleeve is magnetized in directions radial to said axis.

7. A magnetic pickup comprising a subassembly as defined in claim 1 and a coil around said other end of the pole piece.

8. A magnetic pickup as defined in claim 7 wherein the magnet sleeve is coterminous with both ends of the pole piece.

9. A magnetic pickup as defined in claim 8 wherein the coil is encapsulated by the magnet sleeve and the leads from the coil emerge from the end of the magnet sleeve adjacent said one end of the pole piece.

10. A magnetic pickup as defined in claim 9 and encapsulated with electrically insulating resin which also encapsulates the leads adjacent the coil.

11. A magnetic pickup as defined in claim 7 wherein the coil does not extend radially outwardly beyond the face of the magnet sleeve.

* * * * *